E. SCHWEITZER.
BOXING FOR AXLES OF FARMING MACHINES.
APPLICATION FILED JUNE 11, 1910.
996,431.
Patented June 27, 1911.
2 SHEETS—SHEET 1.
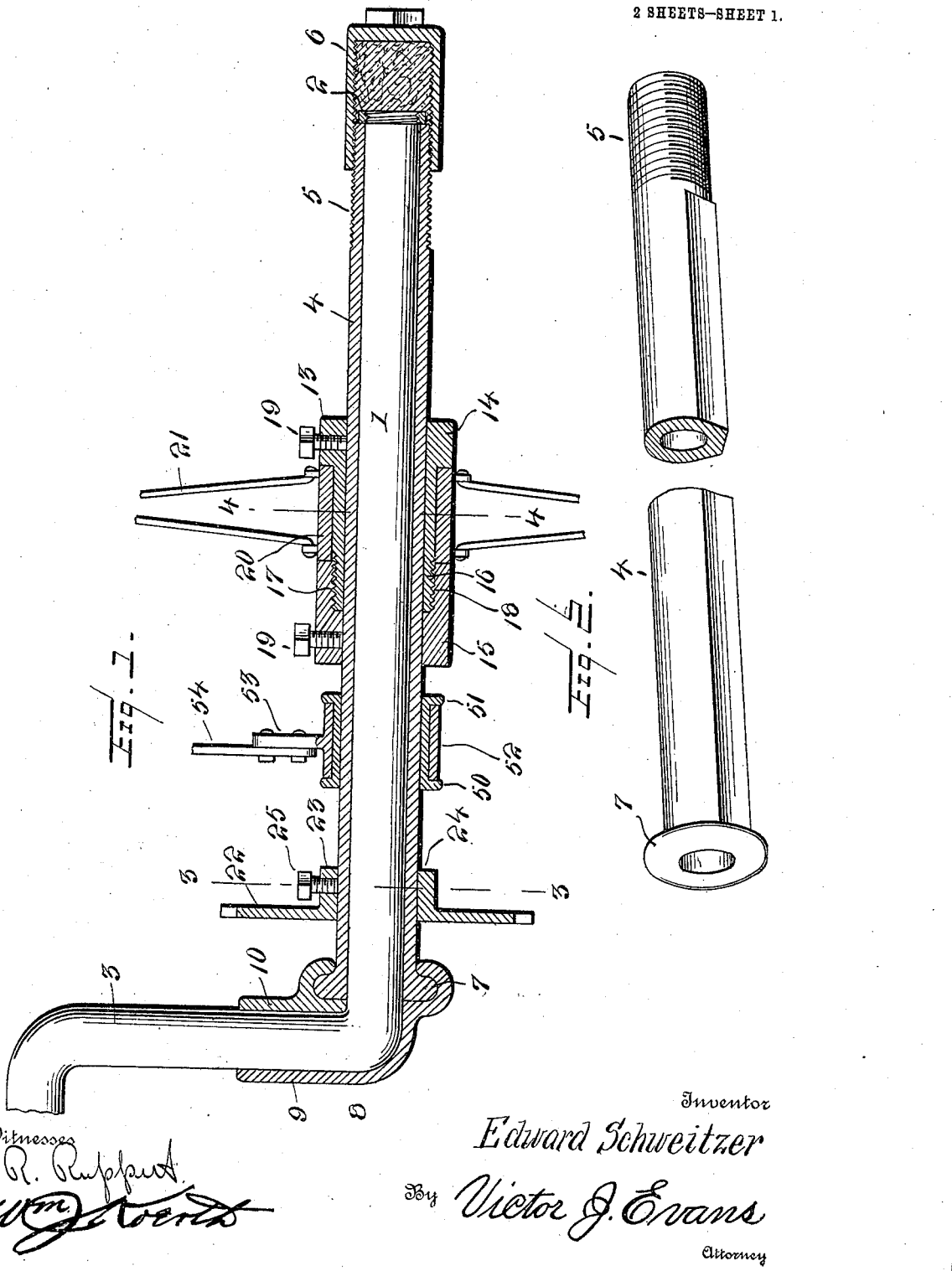
Witnesses
E. R. Ruppert
Wm. Roberts
Inventor
Edward Schweitzer
By Victor J. Evans
Attorney
THE NORRIS PETERS CO., WASHINGTON, D. C.

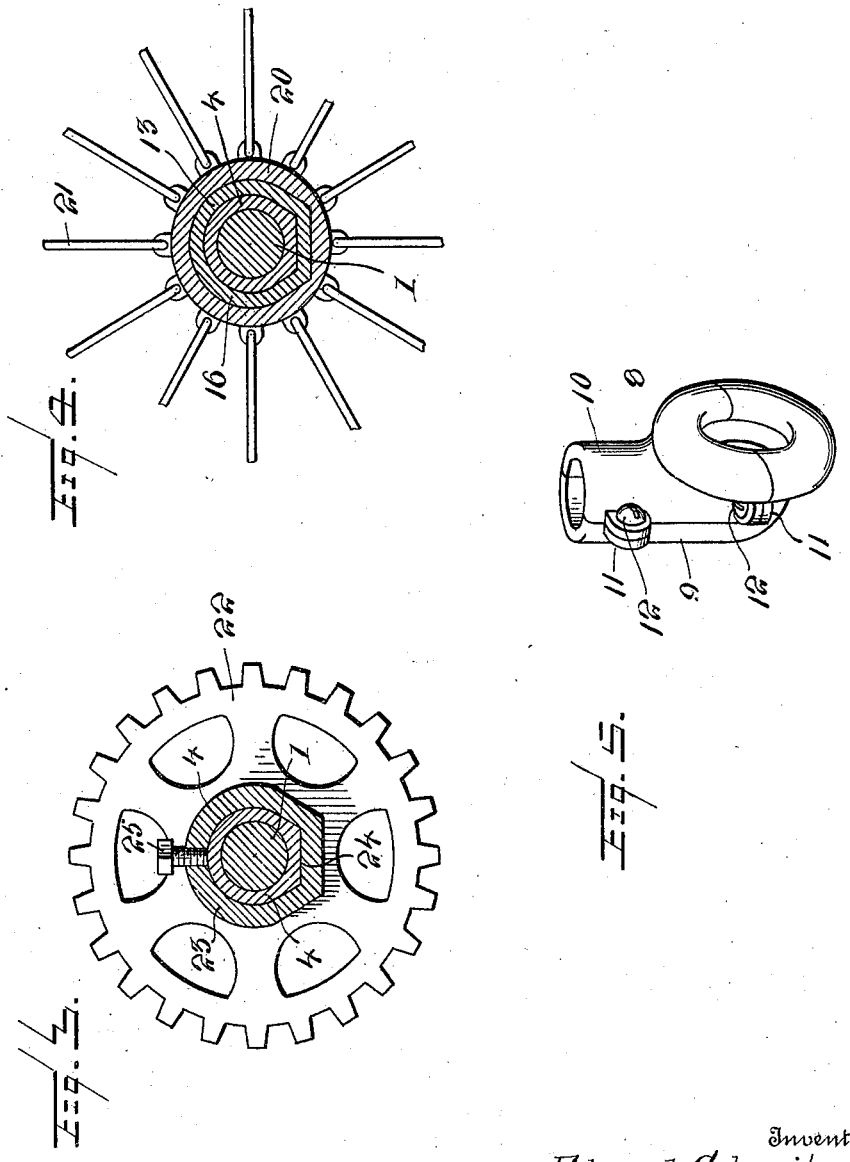

UNITED STATES PATENT OFFICE.

EDWARD SCHWEITZER, OF MANITOU, OKLAHOMA.

BOXING FOR AXLES OF FARMING-MACHINES.

996,431.  Specification of Letters Patent. Patented June 27, 1911.

Application filed June 11, 1910. Serial No. 566,348.

*To all whom it may concern:*

Be it known that I, EDWARD SCHWEITZER, a citizen of the United States, residing at Manitou, in the county of Tillman and State of Oklahoma, have invented new and useful Improvements in a Boxing for Axles of Farming-Machines, of which the following is a specification.

This invention relates to axle boxings and is primarily intended for use upon farming implements, and the primary object of the invention is to provide a device of this character which is of comparatively simple construction, cheap to manufacture, which may be easily and quickly positioned upon the axle, and which will effectively prevent the entrance of dust and dirt to the axle.

Another object of the invention is to provide a boxing for axles or spindles which effectively protects the said axle or spindle from the entrance of dust or dirt, and which is provided with a lubricating receptacle whereby the lubricant is constantly applied to the spindle or axle.

Another object of the invention is the construction of a boxing whereby the wheel of the vehicle may be readily adjusted longitudinally thereon, so as to vary the distance between the wheels, a feature greatly to be desired in farming devices, such as listers or the like.

With the above, and other objects in view, which will appear as the description progresses, the invention resides in the novel construction and combination of parts, hereinafter fully described and claimed.

In the accompanying drawings, there has been illustrated a simple and preferred embodiment of the improvement, and in which drawings:—Figure 1 is a longitudinal sectional view of a boxing constructed in accordance with the present invention, and showing the same in applied position upon an axle; the wheel hub, the frame support and the sprocket driving wheel being shown thereon, all of the said members being illustrated in section; Fig. 2 is a perspective view of the boxing removed from the axle; Fig. 3 is an enlarged sectional view upon the line 3—3 of Fig. 1; Fig. 4 is a similar sectional view upon the line 4—4 of Fig. 1; Fig. 5 is a detail perspective view of the boxing securing collar.

In the accompanying drawings, the numeral 1 designates an axle. The longitudinal member of the axle 1 is provided at its outer extremity with a removable nut 2, and positioned upon the axle between its collar 2 and the offset portion 3 of the axle, is a boxing 4. This boxing is provided with a central bore, while its outer surface is of a non-circular cross sectional shape, as clearly illustrated in Fig. 2 of the drawings. The outer extremity of the boxing 4 is of a circular cross sectional shape and is provided with suitable threads 5. The threads 5 of the said boxing are adapted to coact with interior threads provided upon a grease or lubricant cup 6. By this arrangement, it will be noted that the lubricant within the cup 6 may be constantly fed to the axle. The opposite end of the boxing 4 is provided with an annular bead or rim 7 and connected with this bead is the dust collar 8. This dust collar 8 comprises a pair of members 9 and 10, each provided with a semi-circular depression which is adapted to engage the bead upon the boxing 4. The members 9 and 10 are further provided with semi-cylindrical depressions adapted for the reception of the axle, and its offset 3. The sides of the members 9 and 10 are provided with suitable ears 11, the same having threaded openings adapted for the reception of removable threaded securing elements 12.

Slidably mounted upon the boxing 4 is a hub receiving member 13. This member 13 comprises a pair of sections 14 and 15. The bores of each of the members 14 and 15 are non-circular to correspond with the non-circular boxing 4. The member 14 is provided with a reduced sleeve 16, and the extremity of said sleeve is further provided with a threaded portion 17. The threaded portion 17 is, of course, of a cylindrical shape, and the threads are adapted to coact with similar threads 18 provided by the member 15. The member 15 is of a thickness corresponding with the member 14, adjacent its reduced cylindrical sleeve 16, and both the members 14 and 15 are securely connected to the boxing 4 through the medium of suitable set screws 19. The sleeve 16 is adapted for the reception of the hub 20 of the work wheel 21. By this construction, it will be readily noted that the member 13 may be slid in either direction upon the boxing 4, so that the wheels 21 only one of which being illustrated in the drawings, may be easily and quickly spaced a desired distance apart to correspond with the work which the machine, to which the axle is connected, is to perform.

The numeral 22 designates a sprocket wheel, which is adapted for engagement with a suitable chain, not shown, which connects with the operating mechanism of the device. This sprocket wheel 22 is provided with a centrally arranged collar 23 and said collar is provided with a non-circular bore 24. The collar 23 is provided with a suitable set screw 25, whereby the said sprocket may be sustained in a laterally adjustable position upon the boxing 4.

From the above description, taken in connection with the accompanying drawings, the advantages of the construction, as well as the mode of operation will be readily apparent to those skilled in the art to which the invention appertains, and while I have illustrated and described the preferred embodiment of the improvement, as it now appears to me, it is to be understood that minor details of construction, size and proportion, within the scope of the following claim, may be resorted to, if desired.

The numeral 50 designates a suitable collar which is mounted upon the member 4. The said collar has its opposite ends provided with offsets or beads 51, and positioned between the said beads is a yoke 52, the same being provided with an upstanding portion 53, to which the frame 54 of the machine is attached.

It is to be understood that the outer periphery of the collar 50 is rounded as is the inner periphery of the yoke 52. By this arrangement the collar which is arranged upon the member 4 may be threaded to rotate with the said member and through the said sleeve without interfering with the vertical or other dispositions of the upstanding portion 53 or the frame 54.

Having thus described the invention, what I claim is:

The combination with an offset axle for farming machines, of a boxing for the axle, said boxing comprising a pair of sections, one of the said sections adapted to engage the longitudinal portion of the axle, the said section being provided with a flattened face and having one of its ends formed with a lubricant cup, the opposite end of the said section having an annular bead, the second section adapted to engage with the vertical portion of the axle, the said second section comprising a pair of members, each of the said members being provided with an offset portion having a depression adapted to engage with the annular bead of the horizontal section, and means for detachably securing the vertical sections together, all substantially as and for the purpose set forth.

In testimony whereof I affix my signature in presence of two witnesses.

EDWARD SCHWEITZER.

Witnesses:
M. L. BOOZER,
PETER SCHWEITZER.